(12) United States Patent
Bahler et al.

(10) Patent No.: US 11,724,536 B2
(45) Date of Patent: Aug. 15, 2023

(54) RADIUS TEMPLATE

(71) Applicant: Toolbro Innovators, LLC, Vernon, CT (US)

(72) Inventors: Philip J. Bahler, Vernon, CT (US); Kent R. Bahler, Vernon, CT (US)

(73) Assignee: TOOLBRO INNOVATORS, LLC, Vernon, CT (US)

( * ) Notice: Subject to any disclaimer, the term of this patent is extended or adjusted under 35 U.S.C. 154(b) by 43 days.

(21) Appl. No.: 17/466,537

(22) Filed: Sep. 3, 2021

(65) Prior Publication Data

US 2023/0070653 A1 Mar. 9, 2023

(51) Int. Cl.
*B43L 7/12* (2006.01)
*G01B 3/56* (2006.01)
*B43L 7/14* (2006.01)

(52) U.S. Cl.
CPC ...... *B43L 7/12* (2013.01); *B43L 7/14* (2013.01); *G01B 3/566* (2013.01)

(58) Field of Classification Search
USPC ......... 33/456, 452, 464, 465, 471, 472, 473, 33/518, 21.1
See application file for complete search history.

(56) References Cited

U.S. PATENT DOCUMENTS

| | | | | |
|---|---|---|---|---|
| 223,372 A * | 1/1880 | Miner | ................ | E04G 21/1841 33/518 |
| 669,395 A * | 3/1901 | Lane | ................ | G01B 3/56 33/472 |
| 735,128 A * | 8/1903 | Murphy | ................ | G01B 3/56 33/472 |
| 820,448 A * | 5/1906 | Turpin | ................ | G01B 3/56 33/456 |
| 1,040,284 A * | 10/1912 | Cunningham | ........... | G01B 3/56 33/473 |
| 1,065,046 A * | 6/1913 | Higgins | ................ | G01B 3/56 33/472 |
| 1,661,096 A * | 2/1928 | Joseph | ................ | G01C 21/20 33/456 |
| 1,924,094 A * | 8/1933 | Graham | ................ | B43L 7/12 33/495 |
| 2,031,661 A * | 2/1936 | Mendenhall | ............. | G01B 3/06 33/420 |

(Continued)

FOREIGN PATENT DOCUMENTS

DE 4244622 A1 * 5/1993 ............... G01B 3/56

*Primary Examiner* — Christopher W Fulton
(74) *Attorney, Agent, or Firm* — Cantor Colburn LLP (57) ABSTRACT

Disclosed is a tool including: first and second members that respectively define: first and second forward ends; first and second bodies that extend along respective first and second elongate axises to first and second aft ends, wherein the first and second forward ends are pivotally connected to a pivot member, whereby the first and second members are configured to pivot about a pivot axis, so that the first and second aft ends move toward and away from each other; and a third member that defines a first transverse end and a third body that extends along a third elongate axis to a second transverse end, wherein: a first slide lock is fixed to the first transverse end of the third member and is operationally connected to the first member; and a second slide lock is operationally connected to the second member and the third member.

20 Claims, 11 Drawing Sheets

(56) References Cited

U.S. PATENT DOCUMENTS

| | | | | | |
|---|---|---|---|---|---|
| 3,574,945 | A | * | 4/1971 | Main | G01C 5/00 |
| | | | | | 33/472 |
| 5,384,967 | A | * | 1/1995 | Helmuth | B43L 7/10 |
| | | | | | 33/456 |
| 5,603,164 | A | * | 2/1997 | Haddix | G01B 5/24 |
| | | | | | 83/522.18 |
| 8,375,592 | B1 | * | 2/2013 | Holt | B43L 7/12 |
| | | | | | 33/456 |

* cited by examiner

RADIUS TEMPLATE

BACKGROUND

The embodiments relate to hand tools and more specifically to a radius template for a work surface. It may be a challenge to properly size and cut paver blocks as caps of a round fire pit. Utilizing hand tools for cutting the paver blocks may result in undercutting of the block, which may require repeated cutting of the block to fit in its end location. Alternatively, overcutting of the block may result in having to discard the block as waste.

BRIEF SUMMARY

Disclosed is a tool including: first and second members that respectively define: first and second forward ends; first and second bodies that extend along respective first and second elongate axises to first and second aft ends, wherein the first and second forward ends are pivotally connected to a pivot member, whereby the first and second members are configured to pivot about a pivot axis, so that the first and second aft ends move toward and away from each other; and a third member that defines a first transverse end and a third body that extends along a third elongate axis to a second transverse end, wherein: a first slide lock is fixed to the first transverse end of the third member and is operationally connected to the first member; and a second slide lock is operationally connected to the second member and the third member.

In addition to one or more of the above disclosed aspects of the tool, or as an alternate, the first and second slide locks respectively include first and second shells that are rectangular tube shaped, wherein the first and second shells respectively define: first and second inlets that are forward facing; first and second outlets that are aft facing; first and second cavities that respectively extend between the first and second inlets and outlets; first and second top walls that are respectively opposite first and second bottom walls; first and second inner walls that face each other and first and second outer walls that face away from each other, wherein: the first and second slide locks respectively include first and second lock features; and the first and second lock features respectively engage the first and second members to positionally lock the first and second slide locks against the first and second members.

In addition to one or more of the above disclosed aspects of the tool, or as an alternate, the first transverse end of the third member is fixed to the first inner wall of the first slide lock; and the second inner wall and second outer wall of the second slide lock respectively have first and second slots, wherein the third member extends through the second slide lock via the first and second slots so that the second slide lock is configured to slide against the third member, toward and away from the first slide lock, and the second lock feature is configured to engage the second member, which frictionally engages the third member to positionally lock the second and third members relative to each other.

In addition to one or more of the above disclosed aspects of the tool, or as an alternate, the first and second lock features respectively are first and second threaded knobs, respectively with first and second threaded shafts; the first and second threaded shafts respectively extend through first and second threaded apertures, which are respectively defined through the first and second top walls of the first and second slide locks, and wherein in operation the first and second threaded shafts respectively engage the first and second members, thereby locking the first, second and third members relative to each other.

In addition to one or more of the above disclosed aspects of the tool, or as an alternate, the first and second members respectively define: first and second inner edges that face each other; and first and second outer edges that face away from each other, wherein the first and second outer edges respectively define first and second sets of notches, wherein: the first set of notches are spaced apart from each other along the first elongate axis by a first distance; and the second set of notches are spaced apart from each other along the second elongate axis by the first distance.

In addition to one or more of the above disclosed aspects of the tool, or as an alternate, the first and second slide locks respectively include first and second bosses, wherein the first and second bosses respectively extend from the first and second top walls to the first and second bottom walls; and when locking the first and second slide locks, the first and second slide locks respectively engage a first notch of the first set of notches, and a second notch of the second set of notches, via the first and second bosses.

In addition to one or more of the above disclosed aspects of the tool, or as an alternate, the third member defines: a third inner edge that faces the pivot member and a third outer edge that faces away from the pivot member, the third outer edge defines a third set of notches that are spaced apart from each other along the third elongate axis by the first distance; and when locking the first and second slide locks against the first and second members, the first slot of the second slide lock engages a third notch of the third set of notches.

In addition to one or more of the above disclosed aspects of the tool, or as an alternate, first and second top surfaces of the first and second members respectively include first and second sets of indicia identifying a distance relative to the pivot axis, wherein the first set of indicia are spaced apart from each other by a second distance, and the second set of indicia are spaced apart from each other by the second distance, wherein each of the first set of indicia is respectively aligned with one of the first set of notches, and each of the second set of indicia is respectively aligned with one of the second set of notches.

In addition to one or more of the above disclosed aspects of the tool, or as an alternate, a third top surface of the third member includes a third set of indicia that identifies a further distance that is relative to the first member, wherein the third set of indicia are spaced apart from each other by a third distance, wherein each of the third set of indicia is respectively aligned with one of the third set of notches.

In addition to one or more of the above disclosed aspects of the tool, or as an alternate, a fourth set of indicia is disposed on the first top surface, identifying an inner vertex angle defined between the first and second members.

In addition to one or more of the above disclosed aspects of the tool, or as an alternate, the pivot member includes a tubular guide member, that is round, at a radial center thereof, defining an inner cylindrical wall configured to guide a ground guide member therethrough along the pivot axis, whereby the tool is configured for being oriented on a work surface when scribing cut lines along the work surface.

In addition to one or more of the above disclosed aspects of the tool, or as an alternate, first and second guide brackets are respectively fixed along the first and second bottom walls of the first and second slide locks for guiding the tool over the work surface, the first and second guide brackets respectively include first and second outer bracket walls, wherein the first and second outer bracket walls respectively extend along the first and second outer walls of the first and second slide locks; and the first and second guide brackets respectively include first and second aft bracket walls, wherein the first and second aft bracket walls respectively extend along the first and second outlets of the first and second slide locks.

In addition to one or more of the above disclosed aspects of the tool, or as an alternate, the pivot member is a hinge bearing and the tubular guide member is a hinge joint.

In addition to one or more of the above disclosed aspects of the tool, or as an alternate, the first and second guide brackets are each right-angle brackets.

In addition to one or more of the above disclosed aspects of the tool, or as an alternate, the first distance is one inch and the second distance is six inches.

In addition to one or more of the above disclosed aspects of the tool, or as an alternate, the fourth set of indicia identifies 22.5 degrees, whereby the tool is configured for scribing cut lines along sixteen paver blocks utilized for capping a round firepit.

In addition to one or more of the above disclosed aspects of the tool, or as an alternate, the first and second members are substantially between three feet and three and a half feet long, and the third member is substantially between one foot and sixteen inches long.

In addition to one or more of the above disclosed aspects of the tool, or as an alternate, the first, second and third members are formed of aluminum or steel.

Further disclosed is a method of scribing cut lines with a tool, the tool having one or more of the above disclosed aspects of the tool, on a paver block for a fire pit that is round and formed of paver blocks, when the paver block is positioned for capping the fire pit, including: locking the first and second slide locks of the tool so that: the first slide lock engages the first notch in the first set of notches on the first member, so that a first radial distance between the pivot axis and the first slide lock corresponds to an outer radius of the fire pit; the second slide lock engages the second notch in the second set of notches on the second member, so that a second radial distance between the pivot axis and the second slide lock corresponds to the outer radius of the fire pit; and either: (i) a circumferential distance between the first and second slide locks corresponds to a widthwise span of the paver block; or (ii) the fourth set of indicia identifies a vertex angle that is equivalent to 360 degrees divided by a number of paver blocks that form a cap of the fire pit; positioning the tubular guide member about the ground guide member located at a radial center of the fire pit; positioning at least one of first and second guide brackets at a respective one of a pair of opposing side corners of the paver block; and scribing cut lines on the paver block via the first and second outer edges of the tool.

In addition to one or more of the above disclosed aspects of the method, or as an alternate, the first and second slide locks are locked so that the circumferential distance between the first and second slide locks corresponds to the widthwise span of the paver block.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
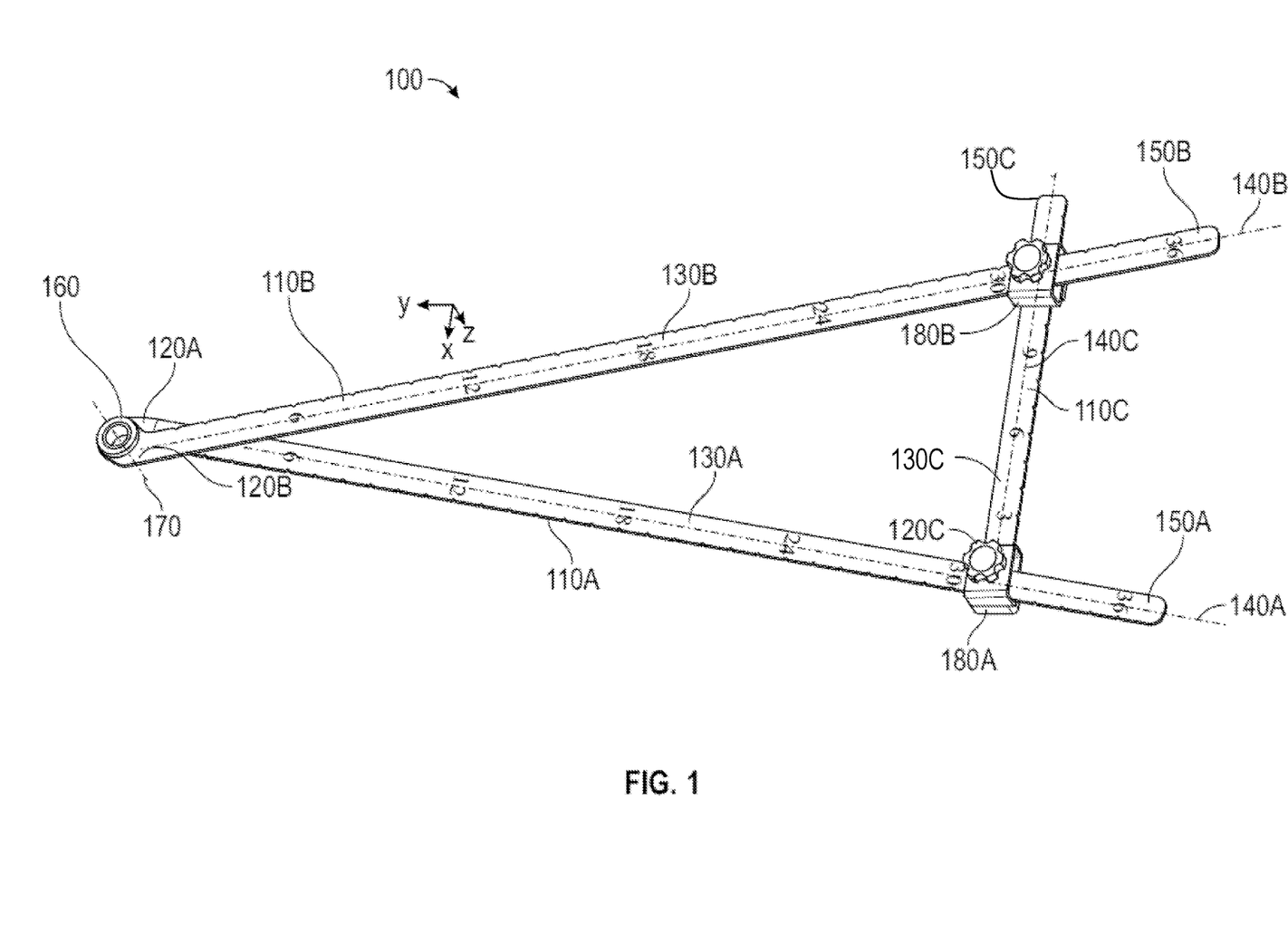
FIG. 1 shows a tool for a work surface.

Turning to FIG. 1, a radius template (otherwise referred to as a tool) 100 is shown according to an embodiment. The tool 100 includes first and second members 110A, 110B. The first and second members 110A, 110B respectively define first and second forward ends 120A, 120B. First and second bodies 130A, 130B of the first and second members 110A, 110B extend along respective first and second elongate axises 140A, 140B to first and second aft ends 150A, 150B. The first and second forward ends 120A, 120B are pivotally connected to a pivot member 160. From this configuration, the first and second members 110A, 110B are configured to pivot about a pivot axis 170. While pivoting, the first and second aft ends 150A, 150B move toward and away from each other, similar to motion of a drawing compass. A third member 110C defines a first transverse end 120C and a third body 130C that extends along a third elongate axis 140C to a second transverse end 150C. In one embodiment, the first, second and third members 110A, 110B, 110C are formed of aluminum or steel.

Figure 2:
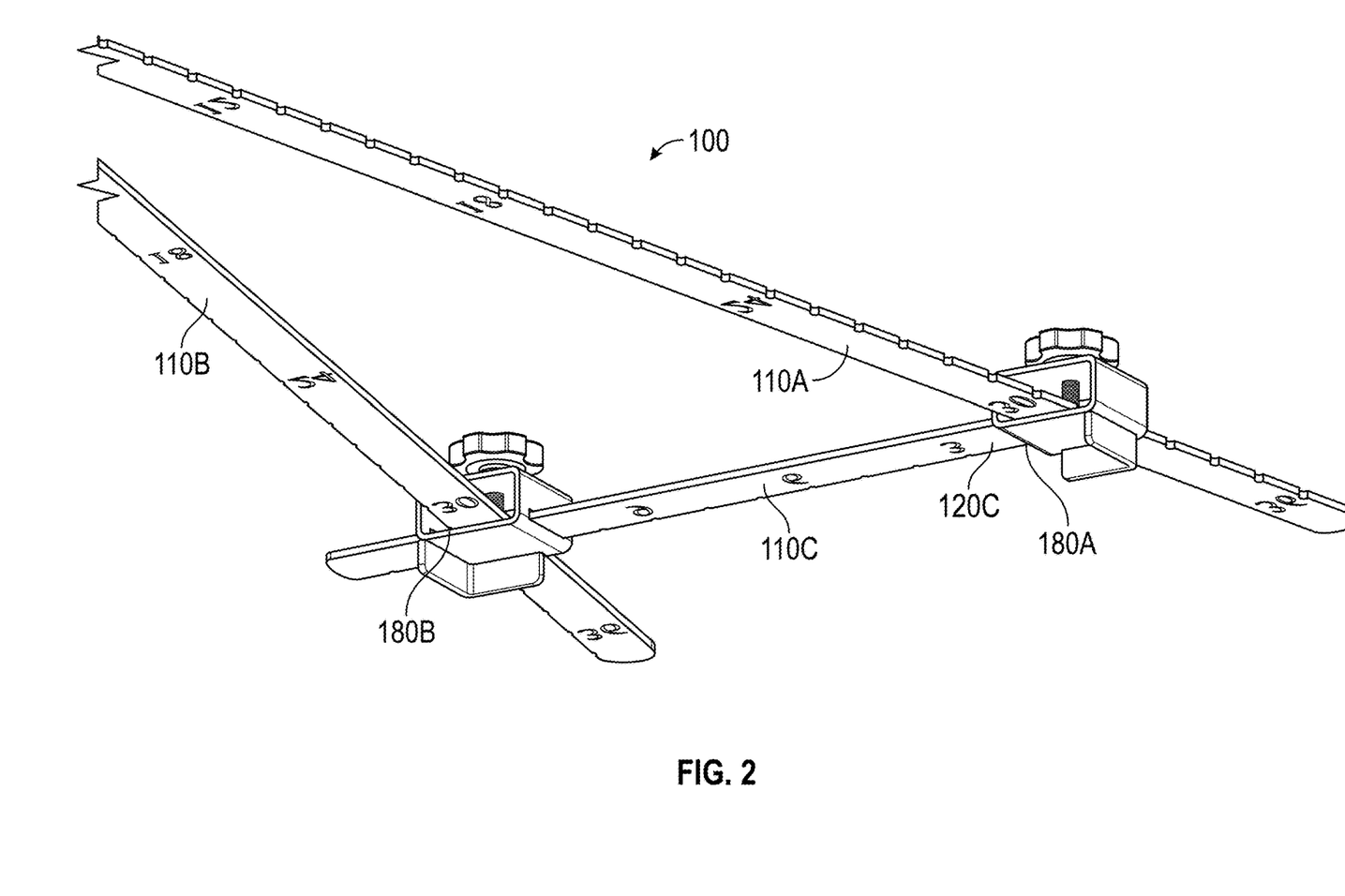
FIG. 2 shows a bottom perspective view of the tool, showing additional features of first and second slide locks.

As shown in FIGS. 1 and 2, a first slide lock 180A is fixed to the first transverse end 120C of the third member 110C and is operationally connected to the first member 110A. A second slide lock 180B is operationally connected to the second member 110B and the third member 110C.

Figure 3:
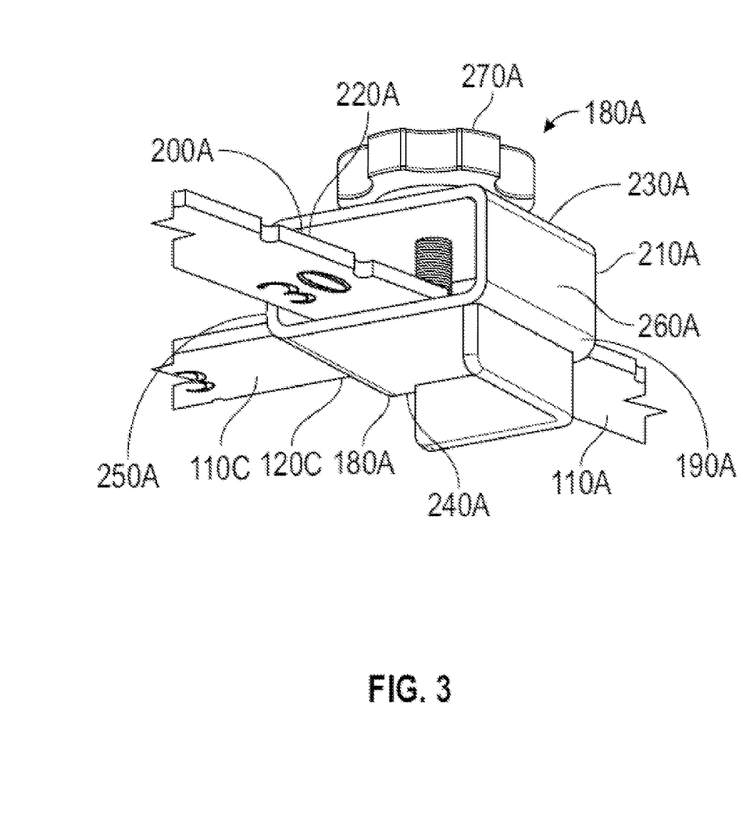
FIG. 3 shows additional features of the first slide lock of the tool.
Figure 4:
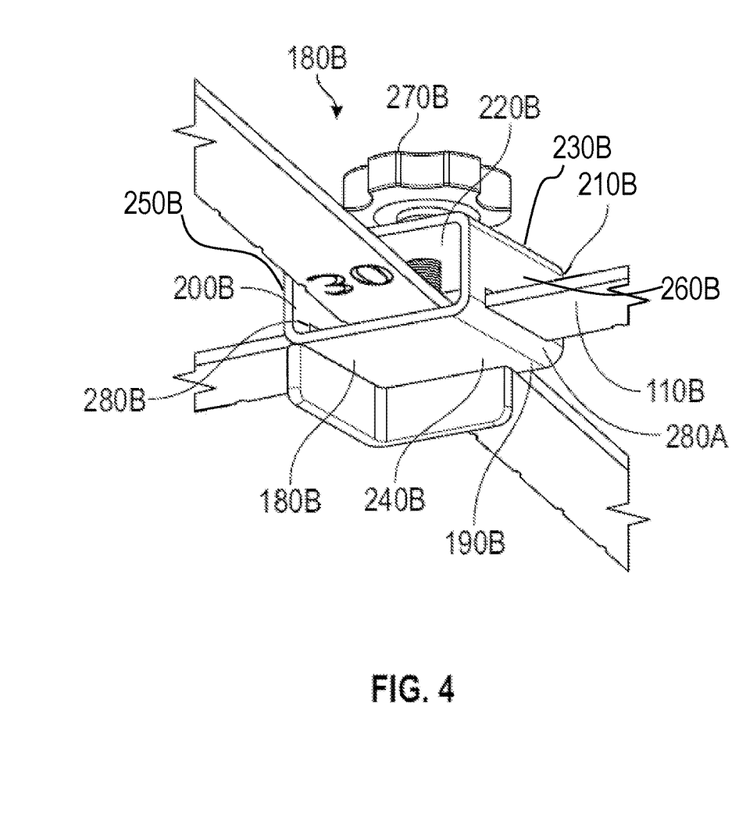
FIG. 4 shows additional features of the second slide lock of the tool.

Turning to FIGS. 3 and 4, the first and second slide locks 180A, 180B respectively include first and second shells 190A, 190B. The shells 190A, 190B may be rectangular tube shaped, though other shapes are within the scope of the embodiments. The first and second shells 190A, 190B respectively define first and second inlets 200A, 200B that are forward facing. First and second outlets 210A, 210B are defined on the shells 190A, 190B which are aft facing. First and second cavities 220A, 220B are defined on shells 190A, 190B, that respectively extend between the first and second inlets 200A, 200B and the first and second outlets 210A, 210B. First and second top walls 230A, 230B are defined on the shells 190A, 190B and are respectively opposite first and second bottom walls 240A, 240B. First and second inner (e.g., inner facing) walls 250A, 250B are defined on the shells 190A, 190B and face each other. First and second outer (e.g., outer facing) walls 260A, 260B are defined on the shells 190A, 190B and face away from each other.

The first and second slide locks 180A, 180B respectively include first and second lock features 270A, 270B. The first and second lock features 270A, 270B respectively engage the first and second members 110A, 110B to positionally lock the first and second slide locks 180A, 180B against the first and second members 110A, 110B.

As shown in FIGS. 3 and 4, the first transverse end 120C of the third member 110C is fixed to the first inner wall 250A of the first slide lock 180A. The second inner wall 250B and second outer wall 260B of the second slide lock 180B respectively have first and second slots 280A, 280B. The third member 110C extends through the second slide lock 180B via the first and second slots 280A, 280B so that the second slide lock 180B is configured to slide against the third member 110C, toward and away from the first slide lock 180A. The second lock feature 270B is configured to engage the second member 110B, which frictionally engages the third member 110C to positionally lock the second and third members 110B, 110C relative to each other.

Figure 5:
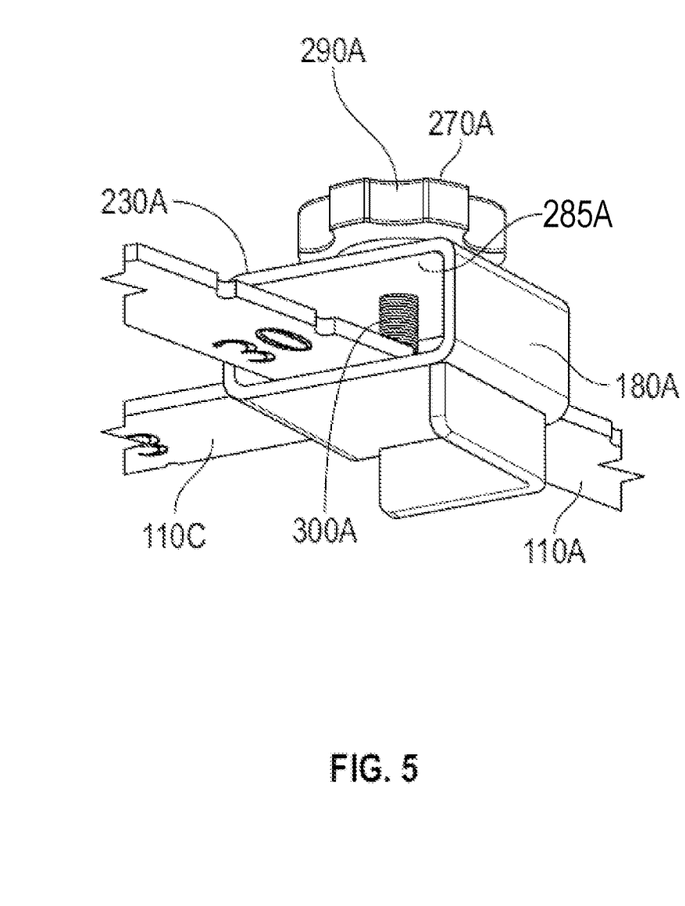
FIG. 5 shows additional features of the first slide lock, including aspects a first lock feature.
Figure 6:
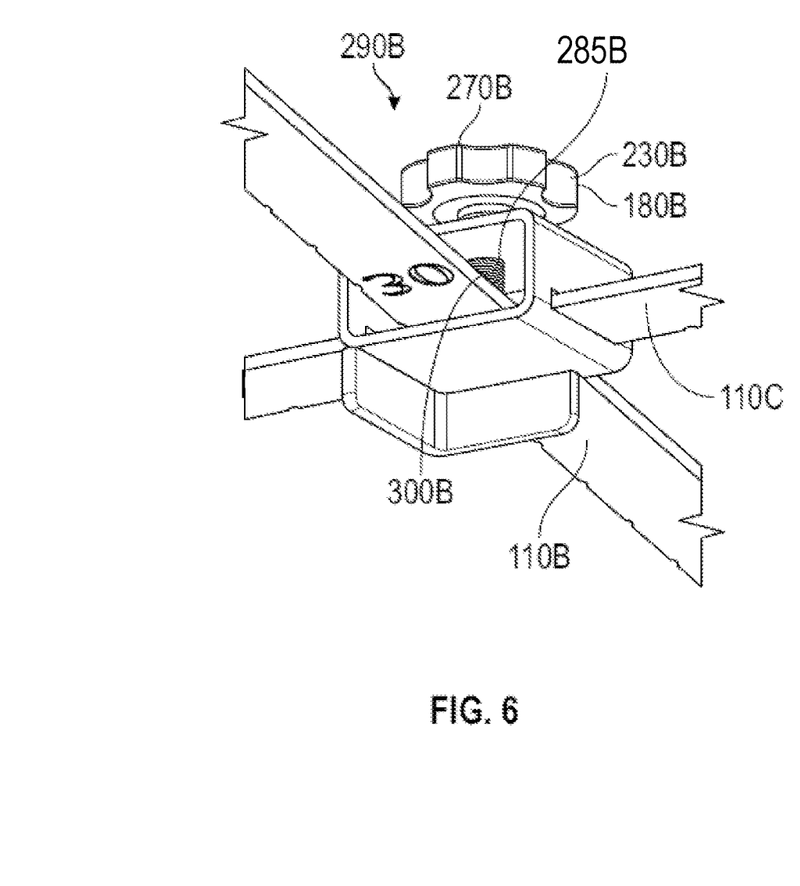
FIG. 6 shows additional features of the second slide lock, including aspects a second lock feature.

Turning to FIGS. 5 and 6, the first and second lock features 270A, 270B respectively are first and second threaded knobs 290A, 290B that have first and second threaded shafts 300A, 300B. The first and second threaded shafts 300A, 300B respectively extend through first and second threaded apertures 285A, 285B. The first and second threaded apertures 285A, 285B are respectively defined through the first and second top walls 230A, 230B of the first and second slide locks 180A, 180B. In operation, the first and second threaded shafts 300A, 300B respectively engage the first and second members 110A, 110B. This configuration locks the first, second and third members 110A, 110B, 110C relative to each other.

Figure 7:
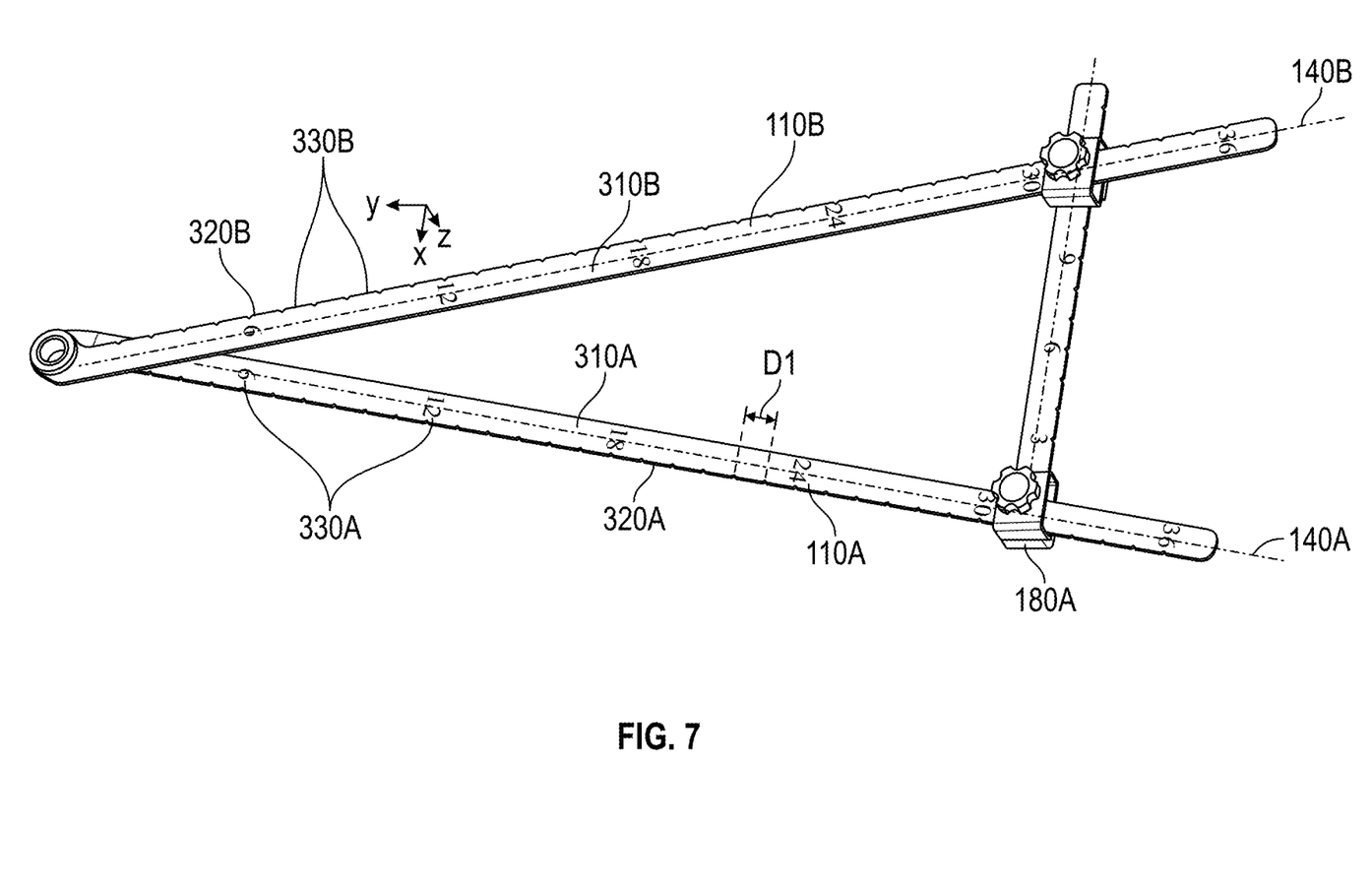
FIG. 7 shows additional features of the tool, including aspects of first and second sets of notches of the tool for being engaged by the first and second slide locks.

Turning to FIG. 7, the first and second members 110A, 110B respectively define first and second inner edges 310A, 310B that face each other. First and second outer edges 320A, 320B are defined on the first and second members 110A, 110B, that face away from each other. The first and second outer edges 320A, 320B respectively define first and second sets of notches 330A, 330B. The first set of notches 330A are spaced apart from each other along the first elongate axis 140A by a first distance (which is a first predetermined distance) D1. The second set of notches 330B are also spaced apart from each other along the second elongate axis 140B by the first distance D1.

Figure 8:
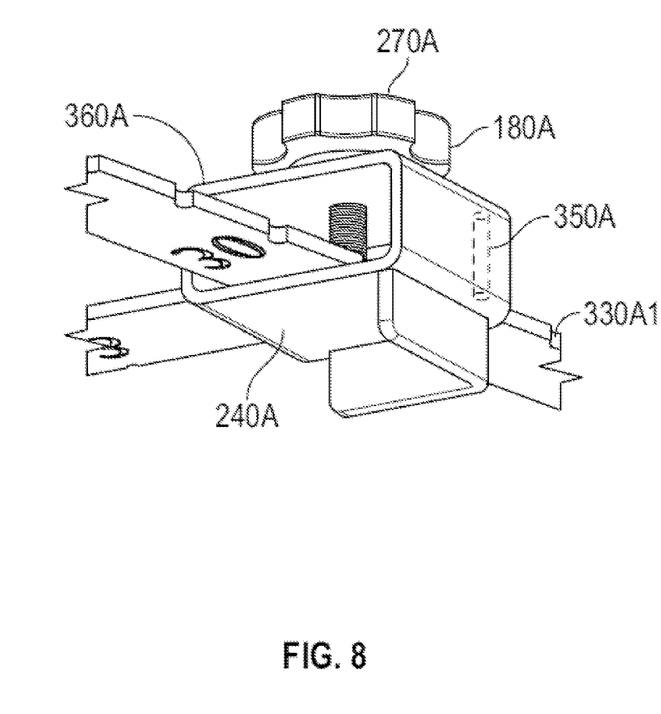
FIG. 8 shows additional features of the first slide lock, including a first boss for engaging the first set of notches.
Figure 9:
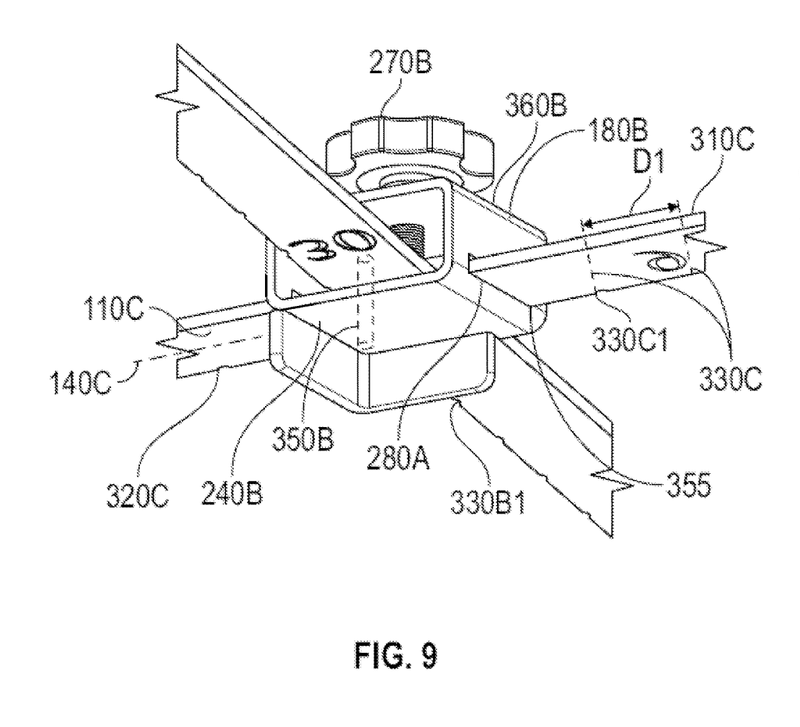
FIG. 9 shows additional features of the second slide lock, including a second boss for engaging the second set of notches.

Turning to FIGS. 8 and 9, the first and second slide locks 180A, 180B respectively include first and second bosses 350A, 350B, e.g., shaped as rods. The first and second bosses 350A, 350B respectively extend from the first and second top walls 230A, 230B to the first and second bottom walls 240A, 240B. The bosses 350A, 350B and are adjacent to the first and second outer walls 260A, 260B, though without blocking the path of motion of the first and second members 110A, 110B in the first and second slide locks 180A, 180B. When locking the first and second slide locks 180A, 180B, the first and second slide locks 180A, 180B respectively engage a first notch 330A1 of the first set of notches 330A and a second notch 330B1 of the second set of notches 330B via the first and second bosses 350A, 350B. This may be achieved, e.g., by applying a slight angulation or twist motion, e.g., by hand, to the first and second slide locks 180A, 180B, e.g., about the locking features 270A, 270B, to move the first and second bosses 350A, 350B toward the path of motion of the first and second members 110A, 110B. This way, the bosses 350A, 350B will each engage a notch to prevent further motion of the first and second members 110A, 110B.

As shown in FIG. 9, the third member 110C defines a third inner edge 310C that faces the pivot member 160 and a third outer edge 320C that faces away from the pivot member 160. The third outer edge 320C defines a third set of notches 330C that are spaced apart from each other along the third elongate axis 140C by the first distance D1. When locking the first and second slide locks 180A, 180B against the first and second members 110A, 110B, the first slot 280A of the second slide lock 180B, via an aft edge 355, engages a third notch 330C1 of the third set of notches 330C. 350B. This may also be achieved, e.g., by applying a slight angulation or twist motion, e.g., by hand, to the second slide lock 180B, e.g., about the second locking feature 270B, to move the aft edge 355 of the first slot 280A toward the path of motion of the third member 110C. This way, the aft edge 355 will engage a notch to prevent further motion of the third member 110C.

Figure 10:
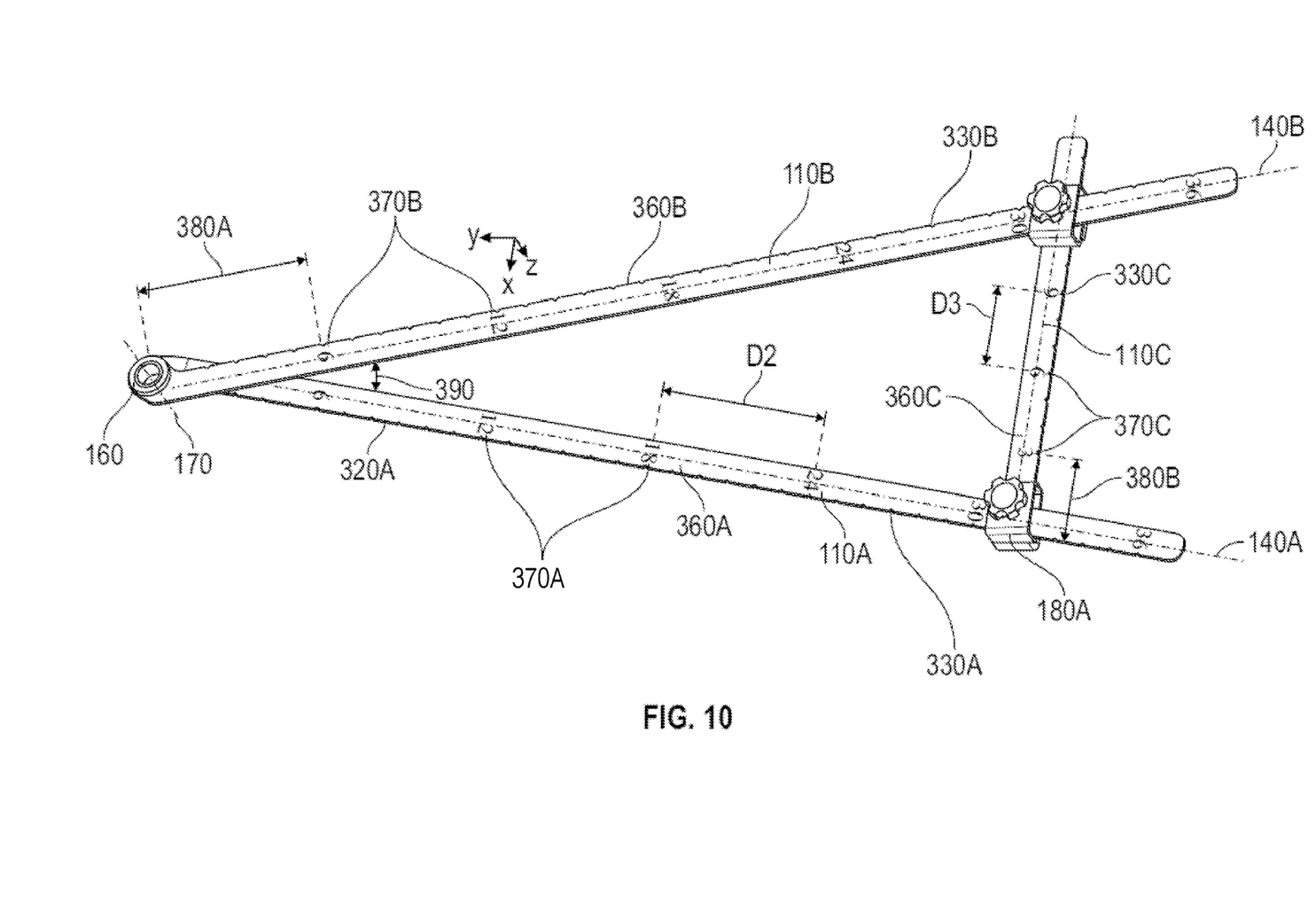
FIG. 10 shows additional features of the tool, including aspects of indica located on the tool.
Figure 15:
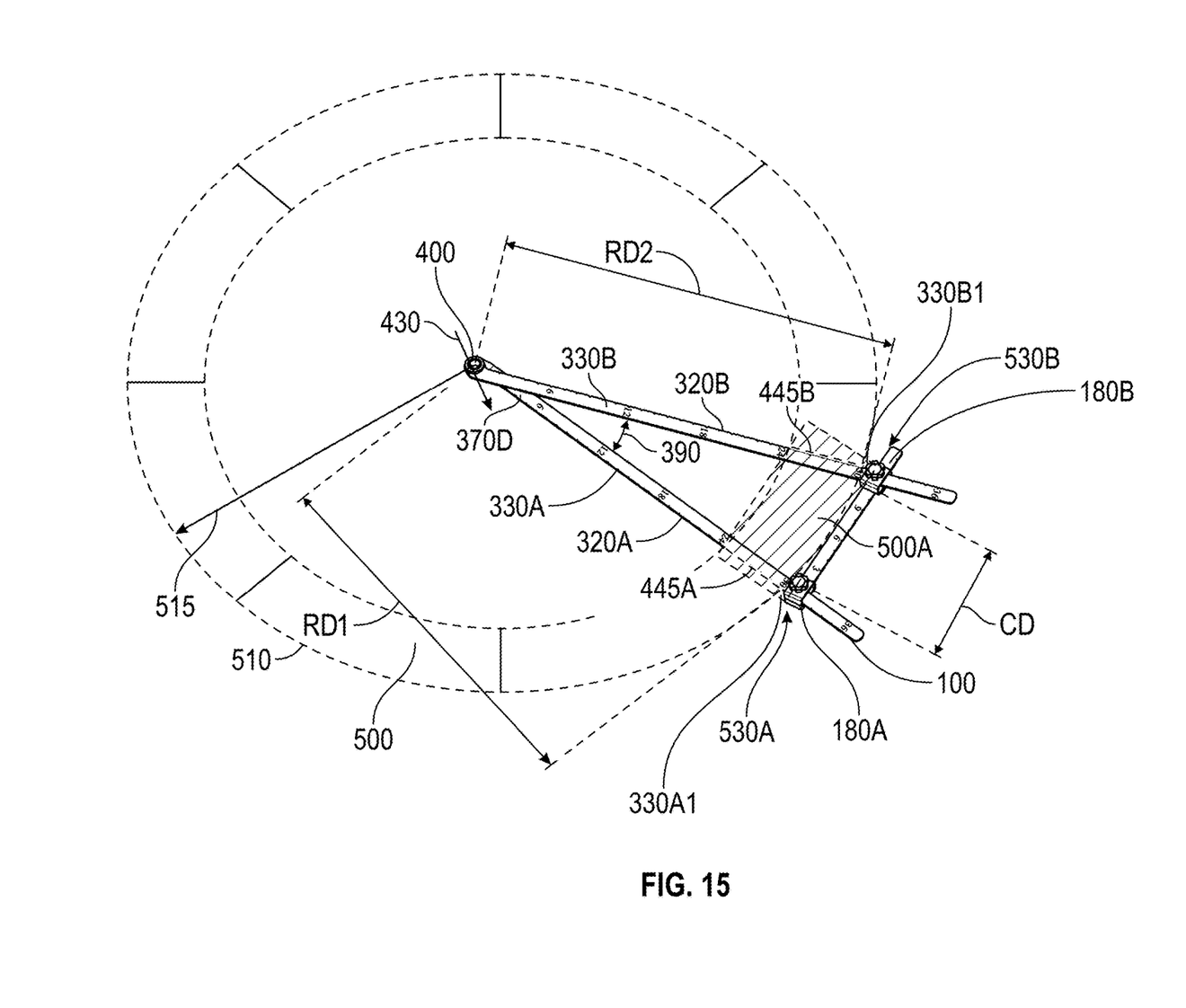
FIG. 15 shows a round fire pit formed of paver blocks, on which a paver block is positioned for capping the fire pit, and where the tool is utilized to scribe cut lines on the paver block.

Turning to FIG. 10, first and second top surfaces 360A, 360B of the first and second members 110A, 110B respectively include first and second sets of indicia (or marking indicia) 370A, 370B identifying a distance 380A relative to the pivot axis 170. As shown in FIG. 15 and discussed in greater detail below, this distance 380A may identify an outer radius 515 of a fire pit 510 that is receiving a paver block 500A for its cap, in a circumstance where the tool 100 is utilized to scribe cut lines 445A, 445B on the paver block 500A (alternatively referred to herein as a work surface). The first set of indicia 370A are spaced apart from each other by a second distance (which is a second predetermined distance) D2 along the first elongate axis 140A. The second set of indicia 370B are spaced apart from each other by the second distance D2 along the second elongate axis 140B. Each of the first set of indicia 370A is respectively aligned with one of the first set of notches 330A. Each of the second set of indicia 370B is respectively aligned with one of the second set of notches 330B. According to an embodiment, the first and second members 110A, 110B may be substantially between three feet and three and a half feet long. In such embodiment, the first distance D1 may be one inch and the second distance D2 may be six inches. The markings for the indicia on the first and second members, as indicated, may be at 6, 12, 18, 24, 30 and 36 inches.

As shown in FIG. 10 a third top surface 360C of the third member 110C includes a third set of indicia 370C identifying a further distance 380B relative to the first member 110A, or more specifically to the first outer edge 320A of the first member 110A. This distance represents the widthwise span of the paver block 500A, as discussed with relation to FIG. 15, below. The third set of indicia 370C are spaced apart from each other by a third distance D3, which may be half of the second distance D2. Each of the third set of indicia 370C is respectively aligned with one of the third set of notches 330C. In an embodiment, the third member 110C is substantially between one foot and sixteen inches long and the third indicia are 3, 6, 9 and 12 inch markings Turning to FIG. 11, a fourth set of indicia 370D is disposed on the first top surface 360A, identifying an inner vertex angle (vertex angle) 390 defined between the first and second members 110A, 110B. According to an embodiment, the fourth set of indicia 370D identifies 22.5 degrees and 90 degrees. From this configuration, the tool 100 is configured for scribing cut lines 445A, 445B, e.g., along outer edges 320A, 320B of (16) sixteen paver blocks 500 utilized for capping a round firepit, as discussed in greater detail below (FIG. 15).

Figure 11:
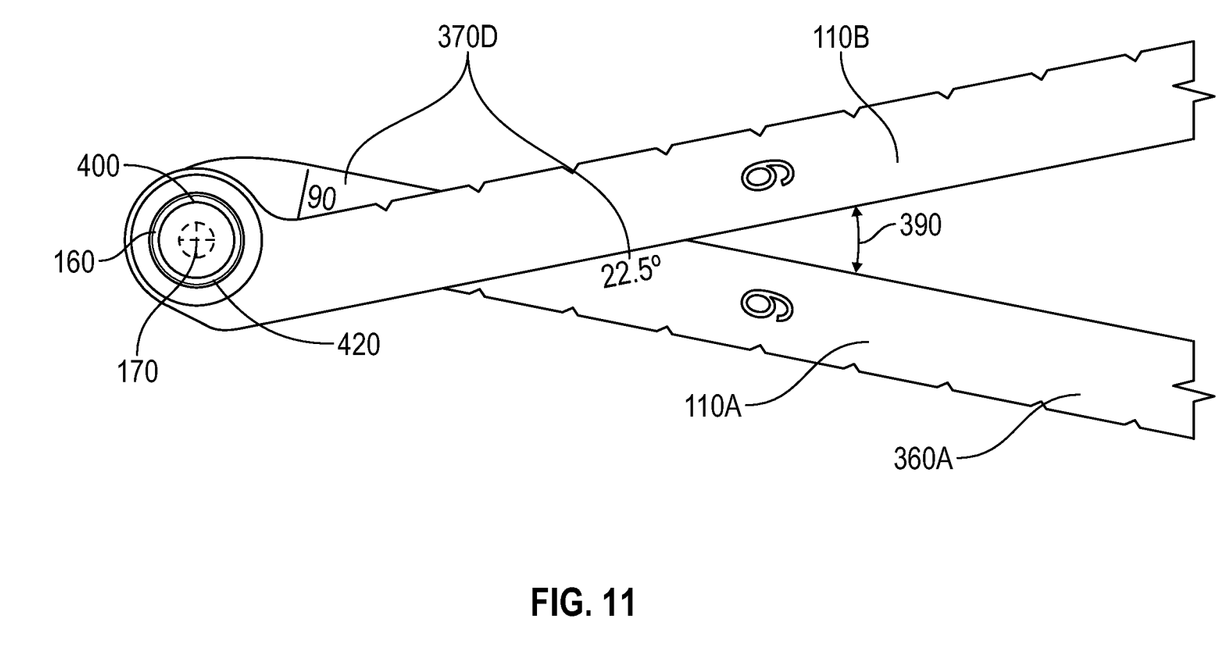
FIG. 11 shows additional features of the tool, including additional indicia located on the tool.

As shown in FIG. 11, the pivot member 160 includes a tubular guide member 400, that is round, at a radial center 410 thereof. The tubular guide member 400 defines an inner cylindrical wall 420 configured to guide a ground guide member (e.g., a guide pin) 430 (FIG. 15) therethrough along the pivot axis 170. From this configuration, the tool 100 is configured for being oriented on a paver block 500A (FIG. 15) when scribing cut lines 445A, 445B (FIG. 15) along the paver block 500A. According to an embodiment, the pivot member 160 is a hinge bearing and the round tubular guide member 440 is the hinge joint.

Figure 12:
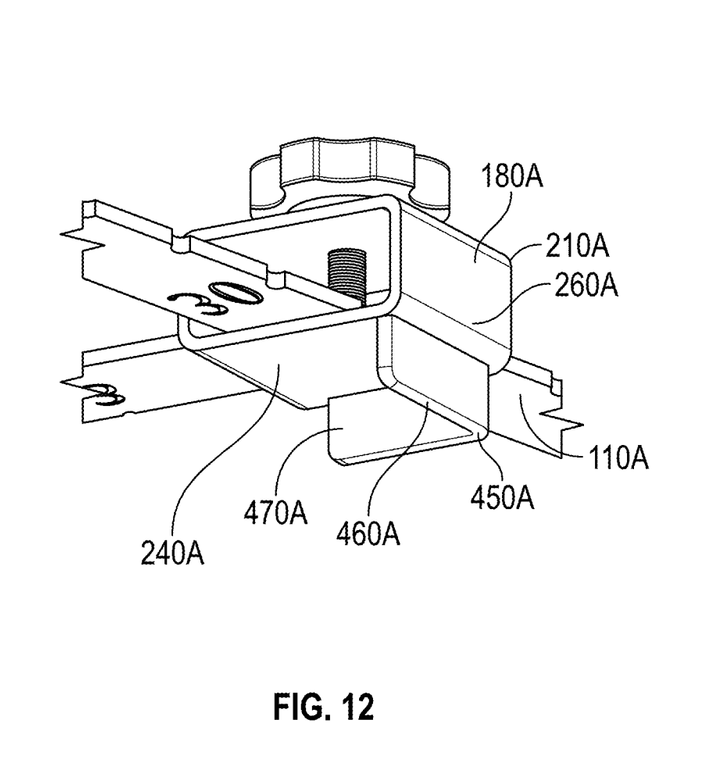
FIG. 12 shows additional features of the first slide lock, including aspects of a first guide bracket.
Figure 13:
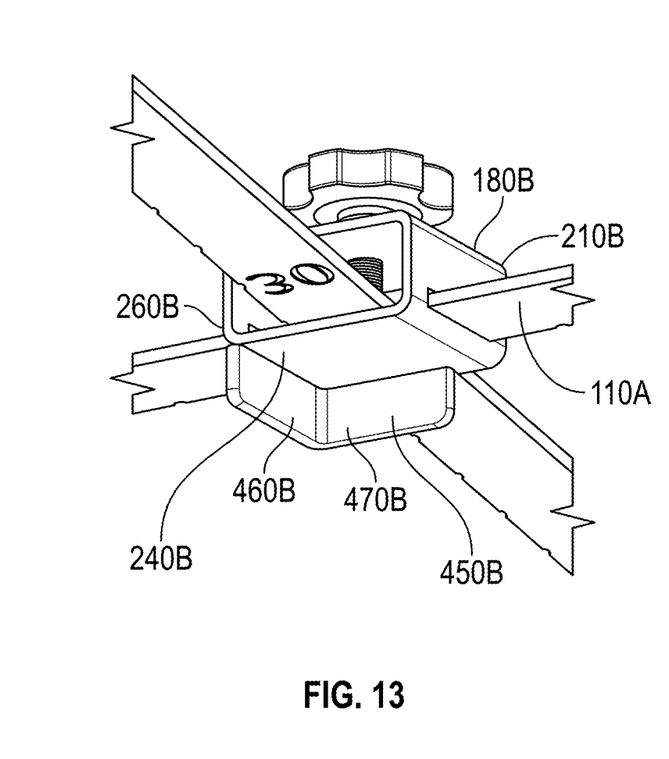
FIG. 13 shows additional features of the second slide lock, including aspects of a second guide bracket.

As shown in FIGS. 12 and 13, first and second guide brackets 450A, 450B are respectively fixed along the first and second bottom walls 240A, 240B of the first and second slide locks 180A, 180B for guide the tool 100 over the paver block 500A. The first and second guide brackets 450A, 450B respectively include first and second outer bracket walls 460, 460B. The first and second outer bracket walls 460A, 460B respectively extend along the first and second outer walls 260A, 260B of the first and second slide locks 180A, 180B. The first and second guide brackets 450A, 450B respectively include first and second aft bracket walls 470A, 470B. The first and second aft bracket walls 470A, 470B respectively extend along the first and second outlets 210A, 210B of the first and second slide locks 180A, 180B. According to an embodiment, the first and second guide brackets 450A, 450B are each right-angle brackets.

Figure 14:
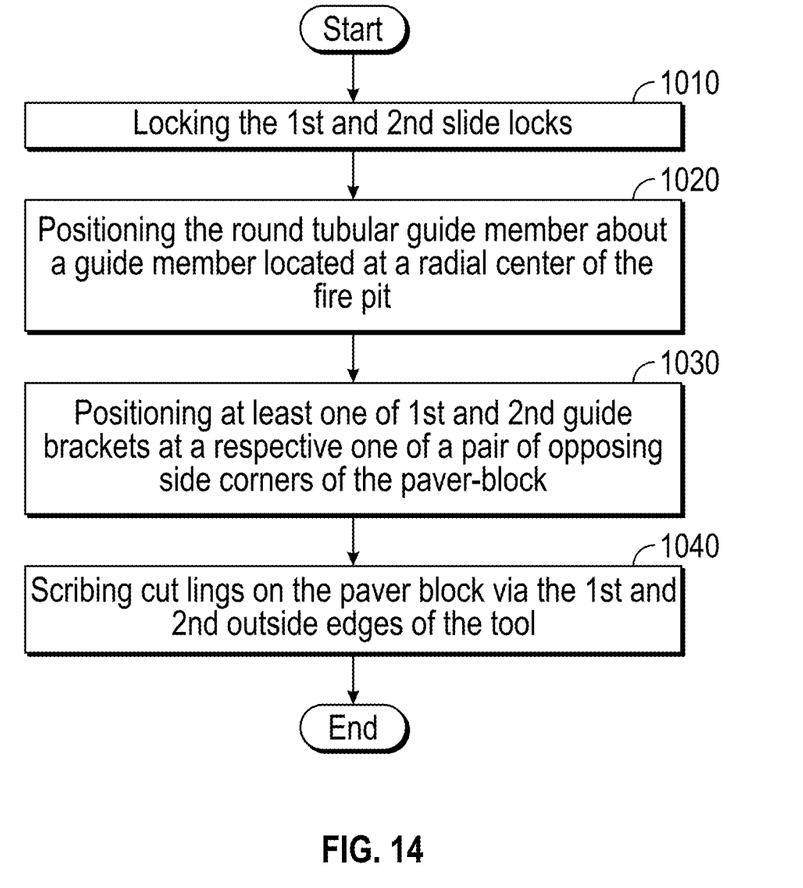
FIG. 14 shows a method of scribing cut lines on a paver block for a round fire pit formed of paver blocks, when the paver block is positioned for capping the fire pit.

Turning to FIGS. 14 and 15, a flowchart and schematic show a method of scribing cut lines 445A, 445B on a paver block 500A for a fire pit 510 that is round and formed of a plurality of paver blocks 500, when the paver block 500A is positioned for capping the fire pit 510. As shown in block 1010, the method includes locking the first and second slide locks 180A, 180B of the tool 100 so that the first slide lock 180A engages the first notch 330A1 in the first set of notches 330A on the first member 110A. From this configuration, a first radial distance RD1 between the pivot axis 170 and the first slide lock 180A is obtained, corresponding to an outer radius 515 of the fire pit 510. In addition, the second slide lock 180B engages the second notch 330B1 in the second set of notches 330B on the second member 110B. From this configuration, a second radial distance RD2 between the pivot axis 170 and the second slide lock 180B is obtained, which also corresponds to the outer radius 515 of the fire pit 510.

There are at least two ways to determine how to set a circumferential distance CD between the first and second slide locks 180A, 180B. A first way is to set this distance CD is to the widthwise span of the paver block 500A, to scribe lines that identify excess material via the outer edges 320A, 320B of the members 110A, 110B. Alternatively, a second way this distance CD can be set is based on utilizing the fourth set of indicia 370D, which identifies a vertex angle 390 that is equivalent to 360 degrees divided by a number of paver blocks 500 that form a cap of the fire pit 510. For example, knowing that (16) sixteen paver blocks will cap a fire pit, if the blocks are cut evenly about the circumference (360 degrees) of the fire pit, then the vertex angle 390 is set to 22.5 degrees because 360/16=22.5. As can be appreciated, more material may be cut from each block using the second way of scribing the cut lines. However, an overall aesthetic may be obtained by having a same size block at each circumferential location along the firepit cap.

As shown in block 1020, the method includes positioning the tubular guide member 400 about a ground guide member 430 located at a radial center 520 of the fire pit 510. As shown in block 1030, the method includes positioning at least one of first and second guide brackets 450A, 450B at a respective one of a pair of opposing side corners 530A, 530B of the paver block 500A. This would correspond with the first way of determining how to set the circumferential distance CD for scribing cut lines, mentioned above. Thus, the first and second slide locks 180A, 180B are locked so that the circumferential distance CD between the first and second slide locks 180A, 180B corresponds to the widthwise span of the paver block 500A. As shown in block 1040, the method includes scribing cut lines 445A, 445B on the paver block 500A via the first and second outer edges 320A, 320B of the tool 100. The paver block 500A may now be cut into shape using an appropriate cutting tool.

Above disclosed is a tool that enables cutting scribe lines on paver blocks utilized for capping round fire pits. The scribe lines will be consistent and accurate, block to block, to provide for improved aesthetics and decreased waste.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A tool comprising:
   first and second members that respectively define: first and second forward ends; first and second bodies that extend along respective first and second elongate axises to first and second aft ends, and the first and second members respectively define: first and second inner edges that face each other; and first and second outer edges that face away from each other, wherein the first and second outer edges respectively define first and second sets of notches;

wherein the first and second forward ends are pivotally connected to a pivot member, whereby the first and second members are configured to pivot about a pivot axis, so that the first and second aft ends move toward and away from each other; and a third member that defines a first transverse end and a third body that extends along a third elongate axis to a second transverse end, wherein:

a first slide lock is fixed to the first transverse end of the third member and is operationally connected to the first member; and a second slide lock is operationally connected to the second member and the third member, wherein:

the first and second slide locks respectively include first and second shells such that the first and second slide locks respectively define first and second top walls that are respectively opposite first and second bottom walls; and first and second bosses, wherein the first and second bosses respectively extend from the first and second top walls to the first and second bottom walls; and when locking the first and second slide locks, the first and second slide locks respectively engage a first notch of the first set of notches, and a second notch of the second set of notches, via the first and second bosses.

2. The tool of claim 1, wherein:

the first and second shells of the first and second slide locks are rectangular tube shaped, such that the first and second slide locks respectively define:

first and second inlets that are forward facing;

first and second outlets that are aft facing;

first and second cavities that respectively extend between the first and second inlets and outlets;

first and second inner walls that face each other and first and second outer walls that face away from each other, wherein:

the first and second slide locks respectively include first and second lock features; and the first and second lock features respectively engage the first and second members to positionally lock the first and second slide locks against the first and second members.

3. The tool of claim 2, wherein:

the first transverse end of the third member is fixed to the first inner wall of the first slide lock; and the second inner wall and second outer wall of the second slide lock respectively have first and second slots, wherein the third member extends through the second slide lock via the first and second slots so that the second slide lock is configured to slide against the third member, toward and away from the first slide lock, and the second lock feature is configured to engage the second member, which frictionally engages the third member to positionally lock the second and third members relative to each other.

4. The tool of claim 2, wherein:

the first and second lock features respectively are first and second threaded knobs, respectively with first and second threaded shafts;

the first and second threaded shafts respectively extend through first and second threaded apertures, which are respectively defined through the first and second top walls of the first and second slide locks, and wherein in operation the first and second threaded shafts respectively engage the first and second members, thereby locking the first, second and third members relative to each other.

5. The tool of claim 2, wherein:

first and second guide brackets are respectively fixed along the first and second bottom walls of the first and second slide locks for guide the tool over a work surface, the first and second guide brackets respectively include first and second outer bracket walls, wherein the first and second outer bracket walls respectively extend along the first and second outer walls of the first and second slide locks; and the first and second guide brackets respectively include first and second aft bracket walls, wherein the first and second aft bracket walls respectively extend along the first and second outlets of the first and second slide locks.

6. The tool of claim 5, wherein the first and second guide brackets are each right-angle brackets.

7. The tool of claim 1, wherein:

the first set of notches are spaced apart from each other along the first elongate axis by a first distance; and the second set of notches are spaced apart from each other along the second elongate axis by the first distance.

8. The tool of claim 7, wherein:

the third member defines: a third inner edge that faces the pivot member and a third outer edge that faces away from the pivot member, the third outer edge defines a third set of notches that are spaced apart from each other along the third elongate axis by the first distance; and when locking the first and second slide locks against the first and second members, the first slot of the second slide lock engages a third notch of the third set of notches.

9. The tool of claim 8, wherein:

first and second top surfaces of the first and second members respectively include first and second sets of indicia identifying a distance relative to the pivot axis, wherein the first set of indicia are spaced apart from each other by a second distance, and the second set of indicia are spaced apart from each other by the second distance, wherein each of the first set of indicia is respectively aligned with one of the first set of notches, and each of the second set of indicia is respectively aligned with one of the second set of notches.

10. The tool of claim 9, wherein:

a third top surface of the third member includes a third set of indicia that identifies a further distance that is relative to the first member, wherein the third set of indicia are spaced apart from each other by a third distance, wherein each of the third set of indicia is respectively aligned with one of the third set of notches.

11. The tool of claim 10, wherein:

a fourth set of indicia is disposed on the first top surface, identifying an inner vertex angle defined between the first and second members.

12. The tool of claim 11, wherein the fourth set of indicia identifies 22.5 degrees, whereby the tool is configured for scribing cut lines along sixteen paver blocks utilized for capping a round firepit.

13. The tool of claim 9, wherein the first distance is one inch and the second distance is six inches.

14. The tool of claim 1, wherein:
the pivot member includes a tubular guide member, that is round, at a radial center thereof, defining an inner cylindrical wall configured to guide a ground guide member therethrough along the pivot axis, whereby the tool is configured for being oriented on a work surface when scribing cut lines along the work surface.

15. The tool of claim 14, wherein the pivot member is a hinge bearing and the tubular guide member is a hinge joint.

16. A method of scribing cut lines with the tool of claim 14 on a paver block for a fire pit that is round and formed of paver blocks, when the paver block is positioned for capping the fire pit, comprising:
locking the first and second slide locks of the tool so that:
the first slide lock engages the first notch in the first set of notches on the first member, so that a first radial distance between the pivot axis and the first slide lock corresponds to an outer radius of the fire pit;
the second slide lock engages the second notch in the second set of notches on the second member, so that a second radial distance between the pivot axis and the second slide lock corresponds to the outer radius of the fire pit; and
either:
a circumferential distance between the first and second slide locks corresponds to a widthwise span of the paver block; or
a set of indicia, disposed on a first top surface of the first member, identifying an inner vertex angle defined between the first and second members that is equivalent to 360 degrees divided by a number of paver blocks that form a cap of the fire pit;
positioning the tubular guide member about the ground guide member located at a radial center of the fire pit;
positioning at least one of first and second guide brackets at a respective one of a pair of opposing side corners of the paver block; and
scribing cut lines on the paver block via the first and second outer edges of the tool.

17. The method of claim 16, wherein:
the first and second slide locks are locked so that the circumferential distance between the first and second slide locks corresponds to the widthwise span of the paver block.

18. The tool of claim 1, wherein the first and second members are substantially between three feet and three and a half feet long, and the third member is substantially between one foot and sixteen inches long.

19. The tool of claim 1, wherein the first, second and third members are formed of aluminum or steel.

20. A tool comprising:
first and second members that respectively define: first and second forward ends; first and second bodies that extend along respective first and second elongate axises to first and second aft ends, wherein the first and second forward ends are pivotally connected to a pivot member, whereby the first and second members are configured to pivot about a pivot axis, so that the first and second aft ends move toward and away from each other; and
a third member that defines a first transverse end and a third body that extends along a third elongate axis to a second transverse end,
wherein:
a first slide lock is fixed to the first transverse end of the third member and is operationally connected to the first member; and
a second slide lock is operationally connected to the second member and the third member, wherein:
the first and second slide locks respectively include first and second shells such that the first and second slide locks respectively define first and second inner walls that face each other and first and second outer walls that face away from each other, and
the first transverse end of the third member is rigidly fixed to the first inner wall of the first slide lock; and
the second inner wall and second outer wall of the second slide lock respectively have first and second slots,
wherein the third member extends through the second slide lock via the first and second slots so that the second slide lock is configured to slide against the third member, toward and away from the first slide lock, and
the second lock feature is configured to positionally lock the second and third members relative to each other.

* * * * *